(12) United States Patent
Ishiwata et al.

(10) Patent No.: US 6,687,082 B1
(45) Date of Patent: Feb. 3, 2004

(54) MAGNETIC HEAD AND MANUFACTURING METHOD THEREOF AND MAGNETIC RECORDING AND REPRODUCING APPARATUS

(75) Inventors: Nobuyuki Ishiwata, Tokyo (JP); Tsutomu Ishi, Tokyo (JP); Mikiko Saito, Tokyo (JP); Hiroaki Honjo, Tokyo (JP); Shinsaku Saito, Tokyo (JP); Tamaki Toba, Tokyo (JP); Yoshihiro Nonaka, Tokyo (JP)

(73) Assignee: NEC Corporation, Tokyo (JP)

( * ) Notice: Subject to any disclaimer, the term of this patent is extended or adjusted under 35 U.S.C. 154(b) by 181 days.

(21) Appl. No.: 09/676,788

(22) Filed: Oct. 2, 2000

(30) Foreign Application Priority Data

Oct. 6, 1999 (JP) ............................................ 11-285241

(51) Int. Cl.$^7$ ............................. G11B 5/147; G11B 5/39
(52) U.S. Cl. ..................... 360/126; 360/317; 29/603.14
(58) Field of Search ................................ 360/126, 317; 29/603.14

(56) References Cited

U.S. PATENT DOCUMENTS

| | | | |
|---|---|---|---|
| 4,661,216 A | 4/1987 | Anderson et al. | 204/44.5 |
| 5,438,747 A | 8/1995 | Krounbi et al. | 29/603 |
| 5,590,008 A | * 12/1996 | Tanabe et al. | 360/126 |
| 6,034,847 A | * 3/2000 | Komuro et al. | 360/126 |
| 6,038,110 A | * 3/2000 | Aboaf et al. | 29/603.14 |
| 6,118,628 A | 9/2000 | Sano et al. | 360/126 |

(List continued on next page.)

FOREIGN PATENT DOCUMENTS

| JP | 63-53277 | 10/1988 |
|---|---|---|
| JP | 6-346202 | 12/1994 |
| JP | 7-262519 | 10/1995 |

OTHER PUBLICATIONS

Hunt, R.P. "A Magnetoresistive Readout Transducer", *IEEE Transactions on Magnetics*, vol. MAG–7, No. 1, pp. 150–154, Mar. 1971.

(List continued on next page.)

Primary Examiner—Jefferson Evans
(74) Attorney, Agent, or Firm—Foley & Lardner (57) ABSTRACT

A magnetic head and a manufacturing method of the magnetic head and a magnetic recording and reproducing apparatus used this head, in which the following problem is solved, are provided. A plated film realizing large saturation magnetization Bs about 2T can not realize a high resistivity at the same time, therefore, when this plated film is applied to a magnetic head, the high frequency characteristic is deteriorated. This problem is solved at the present invention. Further, the present invention provides a magnetic head that is low cost and has large saturation magnetization Bs, and has a excellent high frequency characteristic suitable for a high density recording. A magnetic head, in which a coil insulated by insulation layers is disposed between a first magnetic core for recording and a second magnetic core for recording that is disposed to face the first magnetic core for recording via a recording gap, and which executes recording by that a magnetic flux of the first and second magnetic cores for recording excited by the coil is generated from the recording gap, is provided. And at least one of the first and second magnetic cores for recording is composed of a first plated magnetic layer and a second plated magnetic layer in a state that the first plated magnetic layer is disposed at the near side of the recording gap, and saturation magnetization of the first plated magnetic layer is 1.7 T (tesla) or more. And when resistivity of the first plated magnetic layer is defined as $\rho 1$ and the thickness of the first plated magnetic layer is defined as $\delta 1$, and resistivity of the second plated magnetic layer is defined as $\rho 2$, and the thickness of the second plated magnetic layer is defined as $\delta 2$, $\rho 1 < \rho 2$, and $\delta 1 < \delta 2$.

1 Claim, 7 Drawing Sheets

U.S. PATENT DOCUMENTS

| | | |
|---|---|---|
| JP | 8-212512 | 8/1996 |
| JP | 10-162322 | 6/1998 |
| JP | 2821456 | 8/1998 |
| JP | 11-16120 | 1/1999 |

OTHER PUBLICATIONS

Tsang, C. et al., "Design, Fabrication & Testing of SpinValve Read heads for High Density Recording", *IEEE Transaction on Magnetics*, vol. 30, No. 6, pp. 3801–3806, Nov. 1994.

Tsang, C. et al., "3 Gb/in$^2$ Recording Demonstration with Dual Element Heads & Thin Film Disks", *IEEE Transaction on Magnetics*, vol. 32, No. 1, pp. 7–12, Jan. 1996.

Tsang, C. et al., "5 Gb/in$^2$ Recording Demonstraction with Conventional AMR Dual Element Heads & Thin Film Disks", *IEEE Transaction on Magnetics*, vol. 33, No. 5, pp. 2866–2871, Sep. 1997.

Tsang, C. et al., "12 Gb/in$^2$ recording demonstration with SV read heads & conventional narrow pole–tip write heads", *IEEE Transaction on Magnetics*, vol. 35, No. 2, pp. 689–694, Mar. 1999.

\* cited by examiner

MAGNETIC HEAD AND MANUFACTURING METHOD THEREOF AND MAGNETIC RECORDING AND REPRODUCING APPARATUS

BACKGROUND OF THE INVENTION

The present invention relates to a magnetic head for a magnetic recording and reproducing apparatus and a manufacturing method of the magnetic head, and a magnetic recording and reproducing apparatus using this magnetic head.

DESCRIPTION OF THE RELATED ART

Because a magnetic recording and reproducing apparatus has been small sized and has had a large capacity, the volume per one bit recorded on a magnetic recording medium has become rapidly small. In order to detect a magnetic signal generated from this small volume of one bit as a large reproducing output, a magnetoresistive (MR) head has been developed. This MR head is described in a technical report written by R. P. Hunt, "A Magnetoresistive Readout Transducer," IEEE Trans. Mag., MAG-7, No. 1, 1971, pp. 150–154.

Further, a giant MR (GMR) head used a GMR effect, which can realize a largely higher output compared with the MR head, has been put to practical use. In this GMR effect, especially, the change of resistance corresponds to a cosine between the magnetizing directions of two adjacent magnetic layers. At an MR effect called a spin-valve effect, a large change of resistance is generated in a small operating magnetic field, therefore, the GMR head using this spin-valve effect has been largely used. This GMR head using the spin-valve effect is described in a technical report written by C. Tsang et al., "Design, Fabrication & Testing of Spin-Valve Read Heads for High Density Recording," IEEE Trans. Mag., Vol. 30, No. 6, 1994, pp. 3801–3806. In this technical report, one of two magnetic layers generating the spin-valve effect is a ferromagnetic pinned layer in which magnetization is fixed so that the direction of the magnetism substantially becomes the direction of the magnetic field of a magnetic recording medium that enters to a magnetic sensing part of the head, by an exchange magnetic field generated by layering an antiferromagnetic film on this one of the magnetic layers. And the other magnetic layer, which contacts with the ferromagnetic pinned layer via a conductive layer such as Cu, is a ferromagnetic free layer whose direction of the magnetism can be changed freely for the magnetic field of the magnetic recording medium. Hereinafter, this GMR head using the spin-valve effect is called a GMR head.

Figure 1:
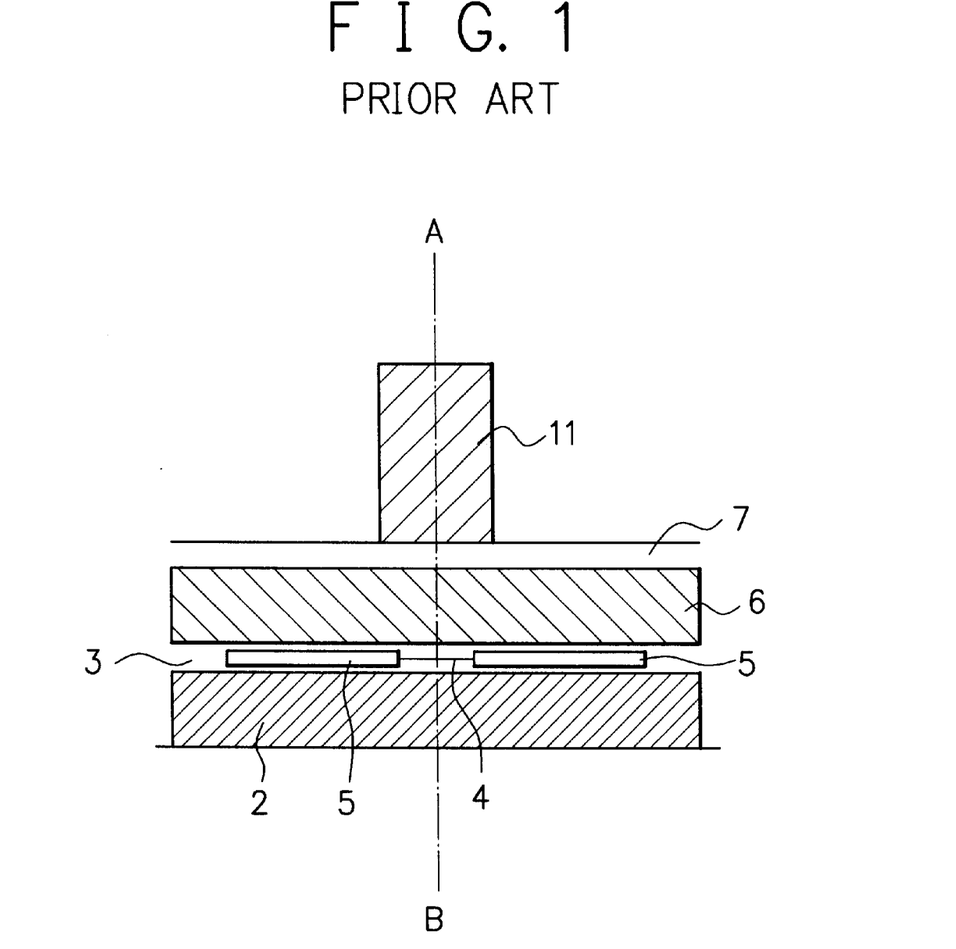
FIG. 1 is a diagram showing a structure of a conventional GMR head seen from an air-bearing surface (ABS) facing a magnetic recording medium.
Figure 2:
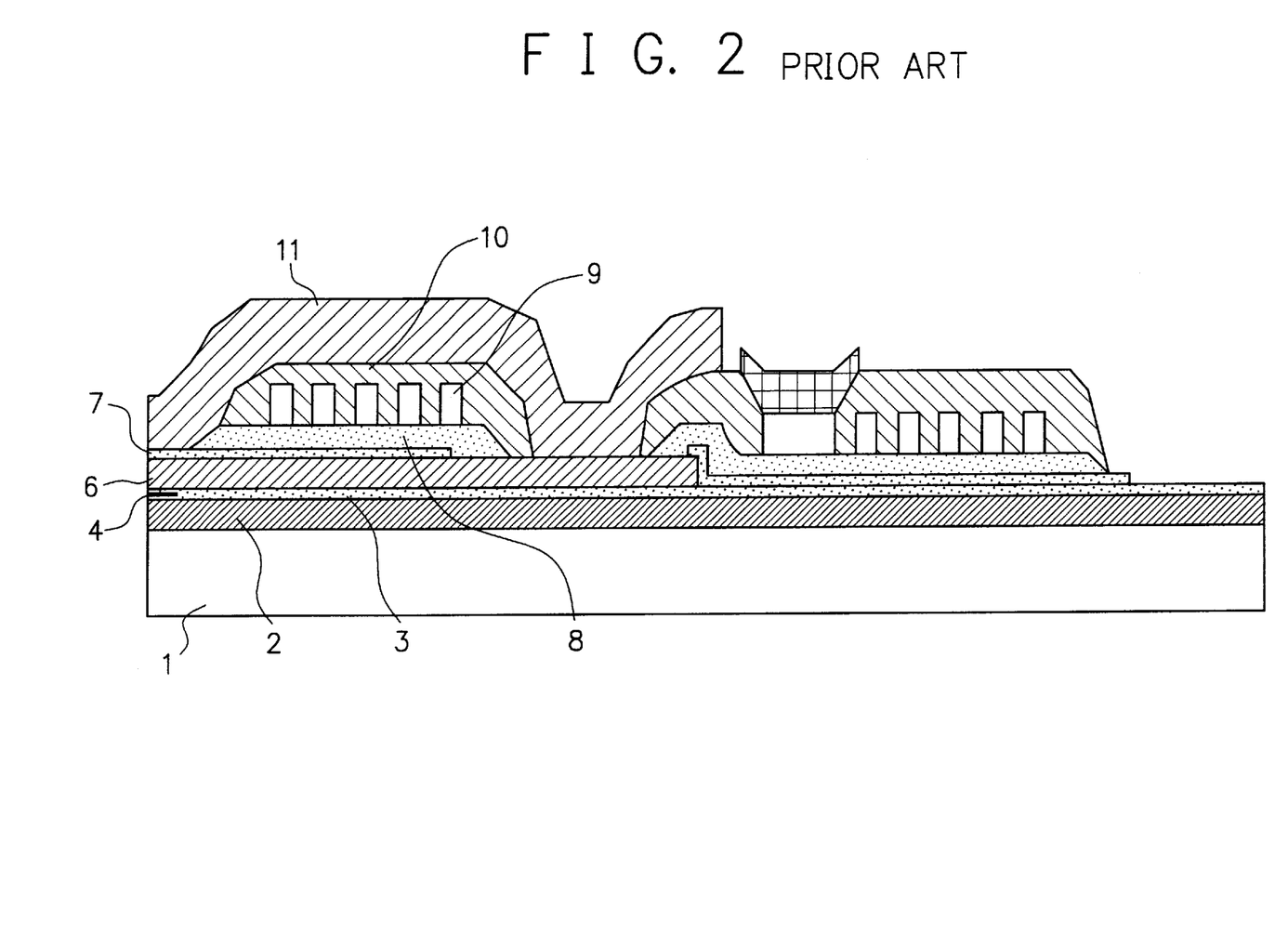
FIG. 2 is a sectional view of the conventional GMR head at the line AB in FIG. 1.

FIG. 1 is a diagram showing a structure of a conventional GMR head seen from an air-bearing surface (ABS) being a surface facing a magnetic recording medium. FIG. 2 is a sectional view of the conventional GMR head at the line AB in FIG. 1. As shown in FIGS. 1 and 2, at the conventional GMR head, a magnetism separating layer 3 made of an insulation material is formed between an upper shield 6 and a lower shield 2 layered on a ceramic 1 becoming a slider, and a spin-valve layered structure generating the GMR effect as a central region 4 is disposed in this magnetism separating layer 3. End regions 5, which supply current and a bias magnetic field to this central region 4, are formed at both ends of this central region 4. The part mentioned above is a GMR element for reproducing.

Further, the upper shield 6 is made to be a first magnetic core 6, and on the opposite side surface of the first magnetic core 6 existing the GMR element, a second magnetic core 11 is layered in parallel with the first magnetic core 6 via a recording gap 7. At the part between the first and second magnetic cores 6 and 11, a coil 9, which is covered with a non magnetizing insulator 8 and a non magnetizing insulator 10, is disposed. Recording is executed by using a magnetic flux generated from the recording gap 7 between the first and second magnetic cores 6 and 11 magnetized by a magnetic field generated by the coil 9. A structure, in which a reproducing head by the GMR element and a recording head by an inductive (ID) head are layered, is a practical GMR head.

The GMR head is actually used at a region in which the recording density is more than 3 G bits per square inche, that is, the region is a high density recording region. In case that the recording density is less than this, a conventional MR head using an anisotropic magnetoresistive (AMR) effect can be used sufficiently. That is, the GMR head usable practically is a head in which a high density recording and reproducing being more than 3 G bits per square inch can be realized. A magnetic recording and reproducing apparatus using the GMR head is a high density magnetic recording and reproducing apparatus that realizes the high density recording and reproducing being more than 3 G bits per square inch.

Not limited to the GRM head, an ID head having a recording function on a magnetic recording medium has been always required that its high density recording performance must be increased. Especially, in order to realize the high density recording, it is necessary that the magnetic recording medium has a high coercive force. Because a magnetic transition length recording on the magnetic recording medium is made to be short corresponding to the increase of the recording density, magnetization must be stable even as magnetization length per bit is made to be short. Consequently, in order that the ID head can record on a high coercive force magnetic recording medium being suitable for high density recording, the development to increase the recording magnetic field has been energetically promoted.

Conventionally, a plated film Ni—Fe, in which Ni is about 80 weight % (hereinafter referred to as 80Ni—Fe), has been used for a magnetic core of the ID head. This material has about 1 T (tesla) saturation magnetization (Bs), and can execute recording of 3 G bits per square inch. This is described in a technical report written by C. Tsang et al., "3 Gb/in$^2$ Recording Demonstration with Dual Element Heads & Thin Film Disks," IEEE Trans. Mag., Vol. 32, No. 1, 1996, pp. 7–12.

However, in order to perform recording of more than 5 G bits per square inches, a plated film Ni—Fe, in which Ni is about 45 weight % (hereinafter referred to as 45Ni—Fe) is required, instead of the 80Ni—Fe. This is described in a technical report written by C. Tsang et al., "5 Gb/in$^2$ Recording Demonstration with Conventional AMR Dual Element Heads & Thin Film Disks," IEEE Trans. Mag., Vol. 33, No. 5, 1997, pp. 2866–2871. This material has saturation magnetization about 1.6 T at maximum. Further, recording of about 12 G bits per square inches can be executed by using this material is described in a technical report written by C. Tsang et al., "12 Gb/in$^2$ recording demonstration with SV read heads & conventional narrow pole-tip write heads," IEEE Trans. Mag., Vol. 35, No. 2, 1999, pp. 689–694.

In Japanese Patent Applications Laid-Open No. HEI 8-212512 and HEI 11-16120, a Ni—Fe plated film having about 1.6 T saturation magnetization (Bs) is described. And in Japanese Patent Application Laid-Open No. HEI 10-162322, it is described that a Co type amorphous material represented by Co—Ta—Zr sputtered film is used as a high saturation magnetization (Bs) material. About 1.5 T being the high saturation magnetization (Bs) is possible by using a Co type amorphous film. And in Japanese Patent Application Laid-Open No. HEI 7-262519, a high saturation magnetization (Bs) material such as ferric nitride is applied. About 1.9 T being the high saturation magnetization (Bs) is possible by using a Fe—N type material.

In order to achieve simplification and low cost at manufacturing processes of a magnetic head, it is effective that a magnetic material forming a recording magnetic core is formed by a plating method. At the plating method, a photo resist frame, in which a pattern of a magnetic core is pressed, is formed beforehand, and a desired pattern can be obtained by making a plated film grow in this photo resist frame. This method is now a standard manufacturing method of a thin film magnetic head because of its simplicity and low cost.

In case that the magnetic core pattern is formed by a sputtering method, a photo resist mask is formed on a magnetic film formed beforehand so that the photo resist mask becomes a shape of a magnetic core, and the magnetic pattern is formed by applying etching used ion beam. However, in this method, first, it is necessary to install a high price ion beam etching apparatus, and second, it needs a long processing time to apply patterning to a magnetic film having several μm thickness, and further, it is very difficult to form the tip part of the magnetic cores, which decides a recording width for the magnetic recording medium, to be a narrow width. Especially, as shown in FIG. 2, the upper surface of the second magnetic core 11 (upper magnetic core) has a large height difference because the coil 9 and the non magnetizing insulators 8 and 10 are disposed, therefore, it is very difficult to apply patterning to the second magnetic core 11 (upper magnetic core). In the Japanese Patent Applications Laid-Open No. HEI 7-262519, only the tip part of a magnetic core is formed before the large height difference is formed by a coil and insulation layers, and a Fe—N sputtered film is formed on this part. However, the ion beam etching is used in this application, therefore this application can not realize a low cost manufacturing method. As mentioned above, applying the sputtering method to form the magnetic cores brings a cost increase caused by the complexity of the manufacturing processes.

As the recording density becomes high, a high saturation magnetization (Bs) film over 1.6 T obtained by 45Ni—Fe is necessary. If this is realized by the plating method being low cost, this is very effective. Further a Co—Ni—Fe type material can be considered as a material to realize the high saturation magnetization (Bs) over 1.6 T by applying the plating method.

In Japanese Patent Publication No. SHO 63-53277, an element map is shown in its FIG. 1. In the element map, a line of the magnetostriction λs=0 by a Co—Ni—Fe plated film is shown. And in an element map shown in its FIG. 2, saturation magnetization (Bs) by the Co—Ni—Fe plated film is shown. From these two element maps, it is disclosed that the saturation magnetization (Bs) of a 80Co-10Ni-10Fe plated film, in which magnetostriction λs substantially becomes zero, is about 1.6 T.

In Japanese Patent Applications Laid-Open No. HEI 6-346202, in order to realize both of the low magnetostriction (λs) and the large saturation magnetization (Bs), which were not realized by the Japanese Patent Publication No. SHO 63-53277 mentioned above, the crystallinity of the Co—Ni—Fe plated film is adjusted. With the result of this adjustment, a Co—Ni—Fe plated film being the magnetostriction $\lambda s < 5 \times 10^{-6}$ and the Bs=about 1.7 T is obtained. And in Japanese Patent Applications Laid-Open No. HEI 7-3498, the crystallinity is also adjusted and the low coercive force is obtained and the large saturation magnetization Bs between about 1.3 T and 2.0 T is obtained. Further in Japanese Patent No. 2821456, a Co—Ni—Fe plated film is formed in a plating bath not containing additives such as saccharin, and the sulfur concentration in the film is made to be less than 0.1 weight %, and a high purity film is realized. With this, against the Japanese Patent Publication No. 63-53277, mixed crystal composition of fcc and bcc is moved to a region where Fe composition is many, and the magnetostriction is decreased to a practical level by this composition, and a extremely large Bs being 1.9 T to 2.2 T with a good soft magnetic characteristic being that the coercive force is less than 2.5 Oe is realized.

As mentioned above, the Co—Fe—Ni type plated film can realize a substantial soft magnetic characteristic as a magnetic core material of the magnetic head, by adjusting the crystallinity and by controlling the containing amount of the material mixed in the film. And as mentioned in the Japanese Patent No. 2821456, the magnetic core having an extremely large saturation magnetization Bs and a good soft magnetic characteristic can be realized.

However, the present invention found that the soft magnetic film having high purity and large saturation magnetization Bs shown in the Japanese Patent No. 2821456 shows a low resistivity value ρ being less than about 20 μΩcm. Table 1 shows the saturation magnetization Bs and the resistivity ρ of magnetic core materials that are applied to a magnetic core of a thin film magnetic head or will be applied in the future.

TABLE 1

| Magnetic core material | Bs(T) | ρ (μΩcm) | Manufacturing method |
|---|---|---|---|
| 82Ni—18Fe | 0.8–0.9 | 18 | Plating |
| 81Ni—19Fe | 1.0 | 21 | Plating |
| 78Ni—22Fe | 1.1 | 25 | Plating |
| 45Ni—55Fe | 1.6 | 50 | Plating |
| 65Co—10Ni—25Fe | 2.2 | 19 | Plating |
| 65Co—12Ni—23Fe | 2.0 | 19 | Plating |
| 66Co—13Ni—21Fe | 1.9 | 18 | Plating |
| 63Co—15Ni—22Fe | 1.7 | 18 | Plating |
| $Co_{90}$—$Ta_5$—$Zr_5$ | 1.5 | 110 | Sputtering |
| $Fe_{80}$—$Ta_8$—$N_{12}$ | 1.6 | 90 | Sputtering |
| $Fe_{90}$—$N_{10}$ | 1.9 | 65 | Sputtering |

Bs(T): saturation magnetization (tesla)
ρ (μΩcm): resistivity

In the Table 1, the Co—Ni—Fe film, whose soft magnetic characteristic is excellent and saturation magnetization (Bs) is large, is considered that the resistivity ρ becomes low because of its high purity. As shown in the Table 1, at the plated film in which a low cost magnetic head can be realized, however, it is difficult to satisfy both a large saturation magnetization Bs about 2 T and a high resistivity ρ at the same time. At the sputtered film, in case of a Fe—N type, a large saturation magnetization Bs nearly 2 T can be realized with keeping a relatively high resistivity ρ. However, as mentioned above, it is technically difficult and brings a cost increase to apply a sputtered film to a magnetic core of a magnetic head, especially, to the upper magnetic core (the second magnetic core 11 in FIG. 1) to which a narrow width process is required.

On the other hand, in the case that a high purity Co—Ni—Fe plated film is applied to a magnetic core for high density recording, the following problem occurs. That is, at the case of the high density recording, the data transfer rate is also required to be high, therefore, recording operation in a high frequency is needed. However, when a magnetic core material whose resistivity is low is used, the characteristic at the high frequency is deteriorated caused by its eddy current loss. At the high density recording region, in order to utilize the large saturation magnetization Bs characteristic of the high purity Co—Ni—Fe plated film, it is necessary to improve the high frequency characteristic of the magnetic core of the magnetic head.

SUMMARY OF THE INVENTION

It is therefore an object of the present invention to provide a magnetic head and a manufacturing method of the magnetic head and a magnetic recording and reproducing apparatus using this head, in which the following problem is solved. A plated film realizing large saturation magnetization Bs about 2 T can not realize a high resistivity at the same time, therefore, when this plated film is applied to a magnetic head, the high frequency characteristic is deteriorated. This problem is solved at the present invention. Further, the present invention provides a magnetic head that is low cost and has large saturation magnetization Bs, and has an excellent high frequency characteristic suitable for a high density recording.

According to a first aspect of the present invention for achieving the object mentioned above, at a magnetic head, in which a coil insulated by insulation layers is disposed between a first magnetic core for recording and a second magnetic core for recording that is disposed to face the first magnetic core for recording via a recording gap, and which executes recording by that a magnetic flux of the first and second magnetic cores for recording excited by the coil is generated from the recording gap, at least one of the first and second magnetic cores for recording is composed of a first plated magnetic layer and a second plated magnetic layer in a state that the first plated magnetic layer is disposed at the near side of the recording gap, and saturation magnetization of the first plated magnetic layer is 1.7 T (tesla) or more, and when resistivity of the first plated magnetic layer is defined as $\rho 1$ and the thickness of the first plated magnetic layer is defined as $\rho 1$, and resistivity of the second plated magnetic layer is defined as $\rho 2$, and the thickness of the second plated magnetic layer is defined as $\rho 2$, $\rho 1 < \rho 2$ and $\delta 1 < \delta 2$.

According to a second aspect of the present invention, in the first aspect, the first plated magnetic layer is composed of mainly Co, Ni, and Fe.

According to a third aspect of the present invention, in the first aspect, the thickness of the first plated magnetic layer is 0.1 $\mu$m or more, and is 1.0 $\mu$m or less.

According to a fourth aspect of the present invention, in the first aspect, the second plated magnetic layer is composed of mainly Ni, and Fe.

According to a fifth aspect of the present invention, a composite type magnetic head provides a reproducing head in which a magnetoresistive effect element that reproduces by magnetoresistive effect is disposed and which is positioned in a insulation layer disposed between two magnetic shields, and a magnetic head in the first aspect, and one of the two magnetic shields is made to also work as the first magnetic core for recording.

According to a sixth aspect of the present invention, there is provided a manufacturing method of a magnetic head, and the first plated magnetic layer and the second magnetic layer are formed by an electrodeposition method.

According to a seventh aspect of the present invention, there is provided a magnetic recording and reproducing apparatus. The magnetic recording and reproducing apparatus provides a magnetic head in the first aspect.

According to an eighth aspect of the present invention, there is provided a magnetic recording and reproducing apparatus. The magnetic recording and reproducing apparatus provides a composite type magnetic head in the fifth aspect.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 3:
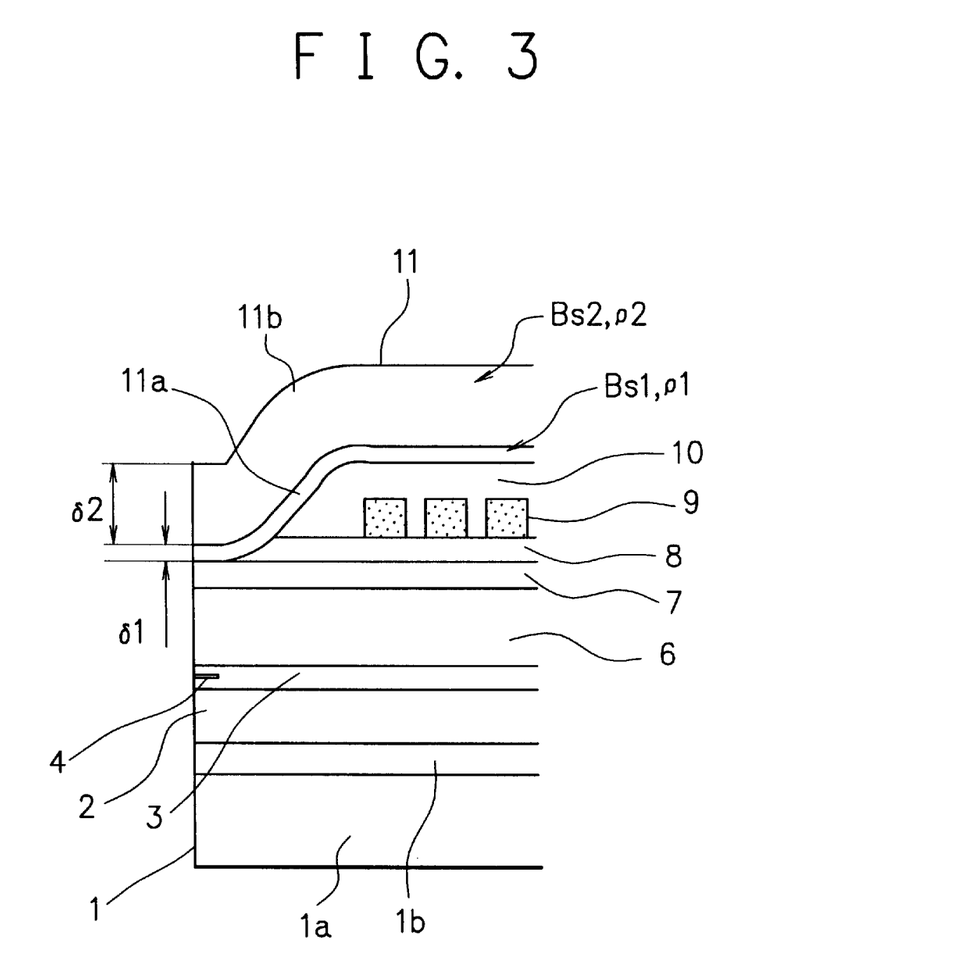
FIG. 3 is a sectional view of a first embodiment of a magnetic head of the present invention at the line AB in FIG. 4.
Figure 4:
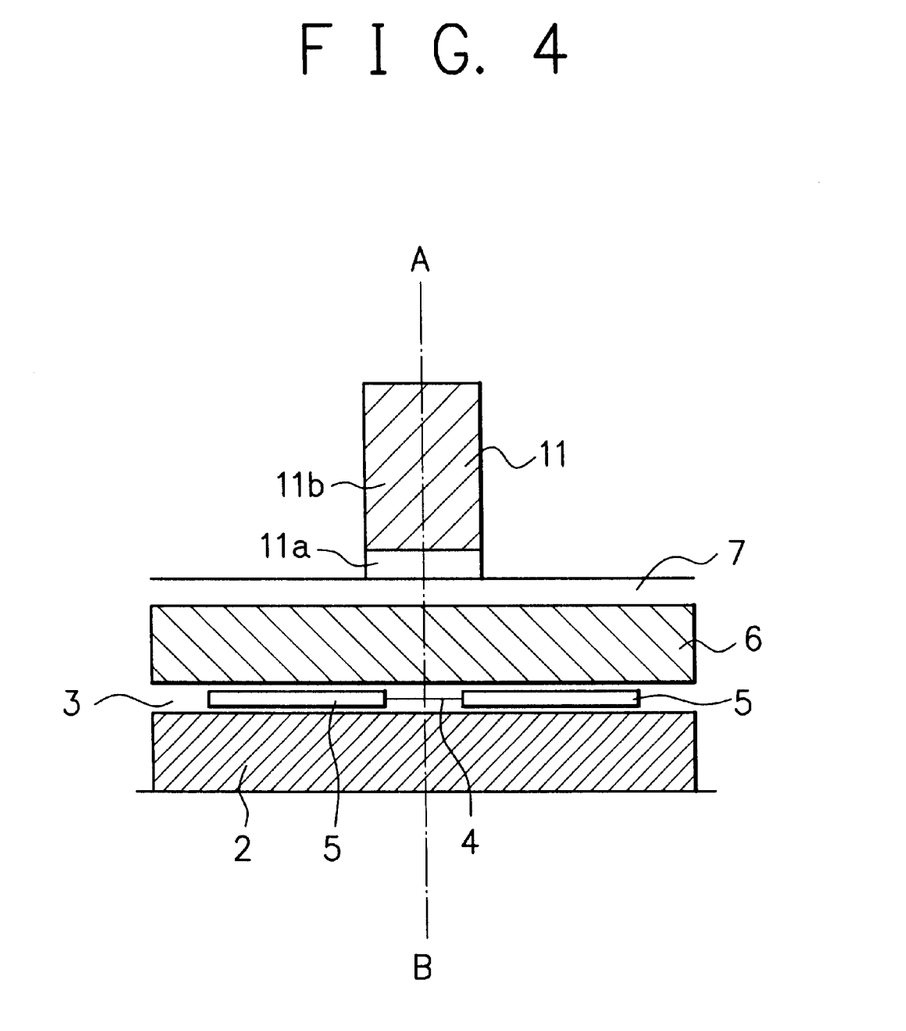
FIG. 4 is a diagram showing a structure of the first embodiment of the magnetic head of the present invention seen from the ABS facing a magnetic recording medium.

Referring now to the drawings, embodiments of the present invention are explained in detail. FIG. 3 is a sectional view of a first embodiment of a magnetic head of the present invention at the line AB in FIG. 4. FIG. 4 is a diagram showing a structure of the first embodiment of the magnetic head of the present invention seen from the ABS facing a magnetic recording medium. As shown in FIG. 3, a substrate 1 becoming a slider consists of a composite ceramic 1a made of alumina and titanium carbide, and an alumina film 1b. On this substrate 1, a MR head having a reproducing function is formed. This MR head consists of a lower shield 2 made of a patterned Co—Zr—Ta film, for example, $Co_{90}$—$Zr_5$—$Ta_5$ showing a soft magnetic characteristic, an upper shield 6 made of a Ni—Fe film in which the Ni is about 80 weight %, and a magnetoresistive effect element disposed between the lower shield 2 and the upper shied 6 and in a magnetism separating layer 3 made of alumina. The thickness of the lower shield 2 is about 1 $\mu$m and the thickness of the upper shield 6 is 2.5 $\mu$m. And the gap between the lower shield 2 and the upper shield 6 is 0.12 $\mu$m.

As shown in FIG. 4, this magnetoresistive effect element consists of a central region 4 that senses a magnetic field from a magnetic recording medium, and end regions 5 that have a function supplying a bias magnetic field and current to the central region 4. This central region 4 has a layered structure having a GMR effect called a spin-valve effect. This layered structure consists of a base Zr film with 3 nm thickness, a Pt—Mn film with 20 nm thickness, a Co—Fe film with 2 nm thickness, a Cu film with 2.1 nm thickness, a Co—Fe film with 0.5 nm thickness, a Ni—Fe film with 2 nm thickness, and a Zr film with 3 nm thickness, layered from the side of the lower shield 2 in order. The width of the central region 4 is 0.4 μm and decides a reproducing track width.

The end regions 5 have a layered structure consisting of a Co—Pt film with 20 nm thickness being a permanent magnetic film, and an Au film with 50 nm thickness being an electrode film. On the GMR head mentioned above, an ID head having a recording function using the upper shield 6 as a first magnetic core is formed. The ID head makes the upper shield 6 being a Ni—Fe plated film whose Ni is 80 weight % with 2.5 μm thickness be the first magnetic core 6, and decides a zero throat height by a non magnetizing insulator 8 existing via a recording gap 7 made of an alumina film with 0.18 μm thickness on the first magnetic core (upper shield) 6. This non magnetizing insulator 8 is made of a photo-resist. And a coil 9 made of a Cu plated film is formed on the non magnetizing insulator 8, and the coil 9 is insulated by a non magnetizing insulator 10 and the non magnetizing insulator 8. This non magnetizing insulator 10 is also made of the photo-resist.

A second magnetic core 11 is formed on the non magnetizing insulator 10. The second magnetic core 11 consists of a magnetic film 1a made of a Co—Ni—Fe film whose saturation magnetization (Bs1) is 2 T and a magnetic film 1b made of a Ni—Fe film whose saturation magnetization (Bs2) is 1.6 T. The film thickness δ1 of the magnetic film 11a is 0.55 μm, and the film thickness δ2 of the magnetic film 11b is 2.5 μm. The Co—Ni—Fe film and the Ni—Fe film are formed by a plating method being a low cost. The Co—Ni—Fe film is composed of 65 weight % of Co, 12 weight % of Ni, and 23 weight % of Fe, and the resistivity ρ1 of the Co—Ni—Fe film was 19 μΩcm. And the Ni—Fe film is composed of 45 weight % of Ni, and 55 weight % of Fe, and the resistivity ρ2 of the Ni—Fe film was 50 μΩcm.

In order to compare with the first embodiment, a first example magnetic head is manufactured. In this first example magnetic head, a second magnetic core 11 is composed of a magnetic film 11a made of a Co—Ni—Fe film with saturation magnetization Bs of 2 T and a magnetic film 11b made of a Ni—Fe film with saturation magnetization Bs of 1.6 T, and the thickness of the magnetic film 11a is 1.5 μm and the thickness of the magnetic film 11b is 1.0 μm. And the other parts are the same that the first embodiment has.

The magnetic head of the first embodiment shows a good recording characteristic at a high frequency compared with the first example magnetic head. That is, at the magnetic head of the first embodiment, the higher the frequency is, the larger an overwrite (O/W) characteristic is and the smaller a non linear transition shift (NLTS) is. At the magnetic head of the first embodiment of the present invention, the magnetic film 11a made of the Co—Ni—Fe film with large Bs of 2 T and 0.55 μm thickness is formed adjacent to the recording gap 7, therefore a sufficiently large recording magnetic field can be generated. And the film thickness of the magnetic film 11a is thin being 0.55 μm and has high saturation magnetization Bs of 2 T, and the magnetic film 11b made of the Ni—Fe film having high resistivity 50 μΩcm is formed with large thickness 2.5 μm, therefore, it is considered that the eddy current loss at the high frequency is restrained.

As a second example to compare with the first embodiment, a second example magnetic head is manufactured. In this second example magnetic head, a second magnetic core 11 is composed of a magnetic film 11a made of a Fe—N film with Bs of 1.9 T and a magnetic film 11b being a Ni—Fe film with Bs of 1.6 T, and the thickness of the magnetic film 11a is 0.55 μm and the thickness of the magnetic film 11b is 2.5 μm. And also a second magnetic core hi in which the thickness of the magnetic film 11a is 1.5 μm and the thickness of the magnetic film 11b is 1.0 μm is manufactured. And the other parts are the same that the first embodiment has. The resistivity ρ1 of the Fe—N film was 65 μΩcm, and the resistivity ρ2 of the Ni—Fe film was 50 μΩcm.

The magnetic head of the first embodiment showed recording characteristics of a good O/W and a good NLTS being almost equivalent to the second example magnetic head at a practical high frequency range from 100 MHz to 300 MHz. This result comes from the fact that the film thickness of the magnetic film 11a is thin being 0.55 μm and the magnetic film 11b made of the Ni—Fe film having high resistivity 50 μΩcm is formed with large thickness 2.5 μm at the first embodiment, therefore, it is considered that the eddy current loss at the high frequency is restrained.

It is considered that other films except a Fe—N film can not be used as a soft magnetic film having high resistivity ρ and Bs of about 2 T, when reliability and corrosion resistance are considered. However, the Fe—N film can not be formed by a plating method, and a sputtering method must be applied.

In case that a magnetic core pattern is formed by the sputtering method, a photo resist mask is formed on a magnetic film formed beforehand so that the photo resist mask becomes a shape of a magnetic core, and the magnetic pattern is formed by applying etching using ion beam. However, in this method, first, it is necessary to install a high price ion beam etching apparatus, and second, it needs a long processing time to apply patterning to a magnetic film having several μm thickness, and further, it is very difficult to form the tip part of the magnetic core, which decides a recording width for a magnetic recording medium, to be a narrow width. Especially, as shown in FIG. 3, the upper surface of the second magnetic core 11 has a large height difference because the coil 9 and the non magnetizing insulators 8 and 10 are disposed, therefore, it is very difficult to apply patterning to the second magnetic core 11. As a result, at the second example magnetic head, the yield at manufacturing was decreased and the manufacturing cost was increased.

On the other hand, at the present invention, the second magnetic core 11 can be formed by the plating method, therefore, the yield at manufacturing was high and the manufacturing cost was low. That is, the magnetic head of the present invention showed a good high frequency characteristic almost equivalent to the second example magnetic head and realized a low cost manufacturing.

As a third example to compare with the first embodiment, a third example magnetic head is manufactured. In this third example magnetic head, a second magnetic core 11 is composed of a magnetic film 11a being a Ni—Fe film with Bs of 1.0 T and a magnetic film 11b being a Ni—Fe film with Bs of 1.6 T, and the thickness of the magnetic film 11a is 0.55 μm and the thickness of the magnetic film 11b is 2.5 μm. And also a second magnetic core 11 in which the thickness of the magnetic film 11a is 1.5 μm and the thickness of the magnetic film 11b is 1.0 μm is manufactured. And the other parts are the same that the first embodiment has. The Ni—Fe film with the Bs of 1 T is composed of Ni 81 weight % and Fe 19 weight % and the resistivity ρ1 of the Ni—Fe film was 21 μΩcm, and the Ni—Fe film with the Bs of 1.6 T is composed of Ni 45 weight % and Fe 55 weight % and the resistivity ρ2 of the Ni—Fe film was 50 μΩcm.

The magnetic head of the first embodiment showed recording characteristics of an excellent O/W and an excellent NLTS compared with the third example magnetic head. This result comes from the fact that the Co—Ni—Fe film with the large saturation magnetization Bs formed adjacent to the recording gap 7 is formed with the thickness of 0.55 frequency, the thickness of the magnetic film 11a must be 1.0 μm or less, preferably 0.7 μm or less.

In Table 2, the composition of the magnetic films 11a and 11b in the second magnetic core 11 of the magnetic head of the first embodiment of the present invention, and that of the first, second, and third example magnetic heads are shown. In the Table 2, the O/W and the NLTS are measured and evaluated under the conditions that magnetic spacing is 30 nm, the magnetic recording medium coercive force is 3700 Oe, and the measured frequency is the frequency range 100 to 300 MHz.

TABLE 2

| Magnetic core material 11a/11b) | Bs1 (T) | Bs2 (T) | ρ1 | ρ2 | δ1 (μm) | δ2 (μm) | O/W (dB) | NTSL (%) | Yield |
|---|---|---|---|---|---|---|---|---|---|
| Present invention 65Co12Ni23Fe/45NiFe | 2.0 | 1.6 | 19 | 50 | 0.55 | 2.5 | 40–45 (good) | 5–10 (good) | Good |
| Present invention 65Co12Ni23Fe/45NiFe | 2.0 | 1.6 | 19 | 50 | 0.30 | 2.7 | 33–40 (good) | 7–15 (good) | Good |
| Present invention 65Co10Ni25Fe/78NiFe | 2.2 | 1.1 | 18 | 25 | 0.55 | 2.8 | 35–47 (good) | 7–13 (good) | Good |
| Present invention 66Co13Ni21Fe/50NiFe | 1.8 | 1.5 | 19 | 45 | 0.60 | 2.2 | 38–43 (good) | 6–11 (good) | Good |
| Present invention 63Co15Ni22Fe/45NiFe | 1.7 | 1.6 | 18 | 50 | 0.70 | 2.5 | 40–45 (good) | 5–10 (good) | Good |
| First example 65Co12Ni23Fe/45NiFe | 2.0 | 1.6 | 19 | 50 | 1.5 | 1.0 | 22–35 (bad) | 10–30 (bad) | Good |
| Second example FeN/45NiFe | 1.9 | 1.6 | 65 | 50 | 0.55 | 2.5 | 38–43 (good) | 3–10 (good) | Bad |
| Second example FeN/45NiFe | 1.9 | 1.6 | 65 | 50 | 1.5 | 1.0 | 40–45 (good) | 3–8 (good) | Bad |
| Third example 81NiFe/45NiFe | 1.0 | 1.6 | 21 | 50 | 0.55 | 2.5 | 10–15 (bad) | 30–50 (bad) | Good |
| Third example 81NiFe/45NiFe | 1.0 | 1.6 | 21 | 50 | 1.5 | 1.0 | 8–13 (bad) | 40–60 (bad) | Good |
| Third example 81NiFe + Mo/45NiFe | 0.8 | 1.6 | 90 | 50 | 0.55 | 2.5 | 7–10 (bad) | 40–60 (bad) | Good |
| Third example 81NiFe + Mo/45NiFe | 0.8 | 1.6 | 90 | 50 | 1.5 | 1.0 | 8–11 (bad) | 40–60 (bad) | Good |

ρ1 and ρ2: μΩcm
Yield: Yield at manufacturing

μm, and a sufficient large recording magnetic field can be generated at the first embodiment.

At the third example, in case that Mo is added to the magnetic film 11a being 81Ni—Fe film so that ρ1>ρ2 and the ρ1 is made to be 90 μΩcm (at this time, the Bs1 is 0.8 T), the result was almost the same that the third example mentioned above has.

At the first embodiment of the present invention, the saturation magnetization Bs of the magnetic film 11b in the second magnetic core 11 is not necessary to be large, but the resistivity ρ2 of the magnetic film 11b is required to be higher than that of the Co—Ni—Fe film being the magnetic film 11a. Therefore, the magnetic film 11b can be formed by one of the other composition of Ni—Fe films, a Co—Ni—Fe film added Mo or Cr, or a Ni—Fe film added Mo or Cr. And in this case, a magnetic head having a good recording characteristic at a high frequency and being a low cost can be obtained as the same as the first embodiment mentioned above.

And at the present invention, in order to obtain increased writing ability, the magnetic film 11a in the second magnetic core 11 must have the thickness being 0.1 μm or more, and preferably, the thickness will be 0.3 μm or more. On the other hand, in order to restrain the influence of the characteristic deterioration (eddy current loss) at the high Next, referring to FIGS. 3 and 4, a manufacturing method of a composite type magnetic head of the first embodiment of the present invention is explained. An alumina film 1b being an insulation material is formed on a composite ceramic 1a, made of alumina and titanium carbide by a sputtering method, as a result, a substrate 1 becoming a slider composed of the alumina film 1b and the composite ceramic 1a is formed. On this alumina film 1b, an MR head having a reproducing function and an ID head having a recording function are formed in order.

The MR head is formed in the following processes. First, a Co—Ta—Zr film becoming a lower shield 2 is formed by the sputtering method with 1 μm thickness. After this, the Co—Ta—Zr film patterned by that etching is applied by an ion beam using a photo resist mask. Next, an alumina film forming a reproducing gap is formed by the sputtering method with 0.03 μm thickness. On this alumina film, a spin-valve layered structure becoming a central region 4 is formed by the sputtering method. This layered structure is formed by layering in order a base Zr film with 3 nm thickness, a Pt—Mn film with 20 nm thickness, a Co—Fe film with 2 nm thickness, a Cu film with 2.1 nm thickness, a Co—Fe film with 0.5 nm thickness, a Ni—Fe film with 2 nm thickness, and a Zr film with 3 nm thickness from the side of the lower shield 2. Further, this layered structure is patterned by the etching applied by the ion beam using a photo resist mask.

By using this photo resist mask, a layered structure film, made of a Co—Pt film with 20 nm thickness and an Au film with 50 nm thickness, becoming end regions 5, is formed by the sputtering method, and by lifting off this photo resist mask, an MR element is completed. On this MR element, an alumina film forming another reproducing gap is formed by the sputtering method with 0.057 μm thickness. The length of this reproducing gap becomes 0.12 μm.

The ID head is formed in the following processes. A magnetic shield (upper shield) 6, which also works as a recording magnetic core, is formed by a method that makes a plating film grow within the photo resist frame. The conditions of a plating bath for the Ni—Fe film are as follows. By using this plating bath, the upper shield 6 being a Ni—Fe plated film having Ni 80 weight % and 2.5 μm thickness is formed.

| Name | Concentration (mol/L) |
|---|---|
| Nickel chloride | 0.16 |
| Nickel surfate | 0.08 |
| Sodium chloride | 0.42 |
| Boric acid | 0.40 |
| Sodium saccharin | 0.0072 |
| Ferrous surfate | 0.0045 |
| Sodium lauryl surfate | 0.00035 |
| 36% hydrochloric acid | 0.0017 |
| PH | 26 |
| Current density | GmA/cm² |

On the first magnetic core (upper shield) 6, a recording gap 7, made of an alumina film with 0.18 μm thickness, is formed by the sputtering method. And after this, a non magnetizing insulator 8 deciding a zero throat height is formed by the photo resist. On this non magnetizing insulator 8, a coil 9 is formed within the photo resist frame by a method that makes a Cu plating film grow. After this, a non magnetizing insulator 10 is formed by the photo resist.

A second magnetic core 11 is formed on a structure composed of the non magnetizing insulator 10 and the coil 9 in a state that the second magnetic core 11 exposes to an ABS facing a magnetic recording medium. At this time, a method that makes a plating film grow within the photo resist frame is used. The second magnetic core 11 consists of a magnetic film 11 consists of a magnetic film 11a made of a Co—Ni—Fe film having Bs of 2 T and a magnetic film 11b made of a Ni—Fe film having Bs of 1.6 T. The conditions of the plating baths for the Co—Ni—Fe film and the Ni—Fe film are as follows:

The conditions of the plating bath for the Co—Ni—Fe film:

| Name | Concentration (mol/L) |
|---|---|
| Cobalt surfate | 0.092 |
| Nickel surfate | 0.20 |
| Ammonium chloride | 0.28 |
| Boric acid | 0.40 |
| Ferrous surfate | 0.0016 |
| Sodium lauryl surfate | 0.00035 |
| 80% sulfuric acid | 0.0012 |
| PH | 2.8 |
| Current density | 15 mA/cm², and |

The conditions of the plating bath for the Ni—Fe film:

| Name | Concentration (mol/L) |
|---|---|
| Nickel chloride | 0.16 |
| Nickel surfate | 0.08 |
| Sodium chloride | 0.42 |
| Boric acid | 0.40 |
| Sodium saccharin | 0.0072 |
| Ferrous surfate | 0.010 |
| Sodium lauryl surfate | 0.00035 |
| 36% hydrochloric acid | 0.0017 |
| PH | 2.6 |
| Current density | 6 mA/cm² |

The thickness of the magnetic film 11a is 0.55 μm and the thickness of the magnetic film 11b is 2.5 μm. The composition of the Co—Ni—Fe film is that the Co is 65 weight %, the Ni is 12 weight %, the Fe is 23 weight %, and the resistivity ρ1 is 19 μΩcm. And the composition of the Ni—Fe film is that the Ni is 45 weight %, the Fe is 55 weight %, and the resistivity ρ2 is 50 μΩcm.

At the manufacturing method of the magnetic head of the present invention, a magnetic head, which is a low cost, and also has large saturation magnetization Bs, and is suitable for a high density recording with a good high frequency characteristic, can be manufactured.

Figure 5:
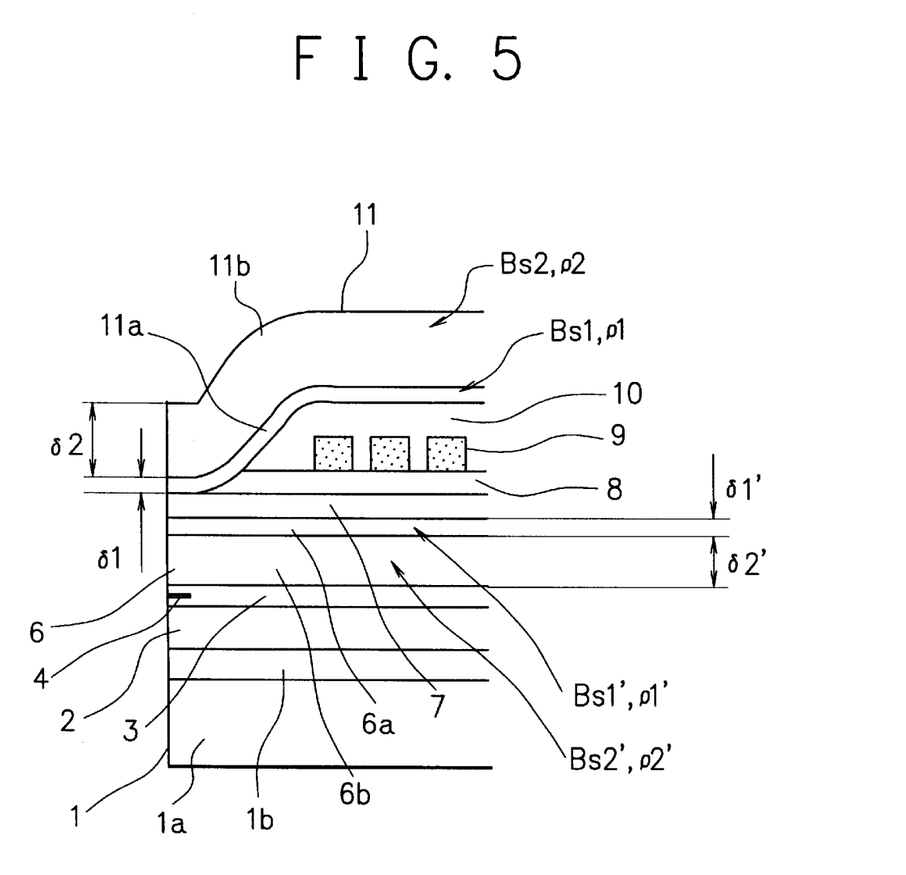
FIG. 5 is a sectional view of a second embodiment of the magnetic head of the present invention at the line AB in FIG. 6.
Figure 6:
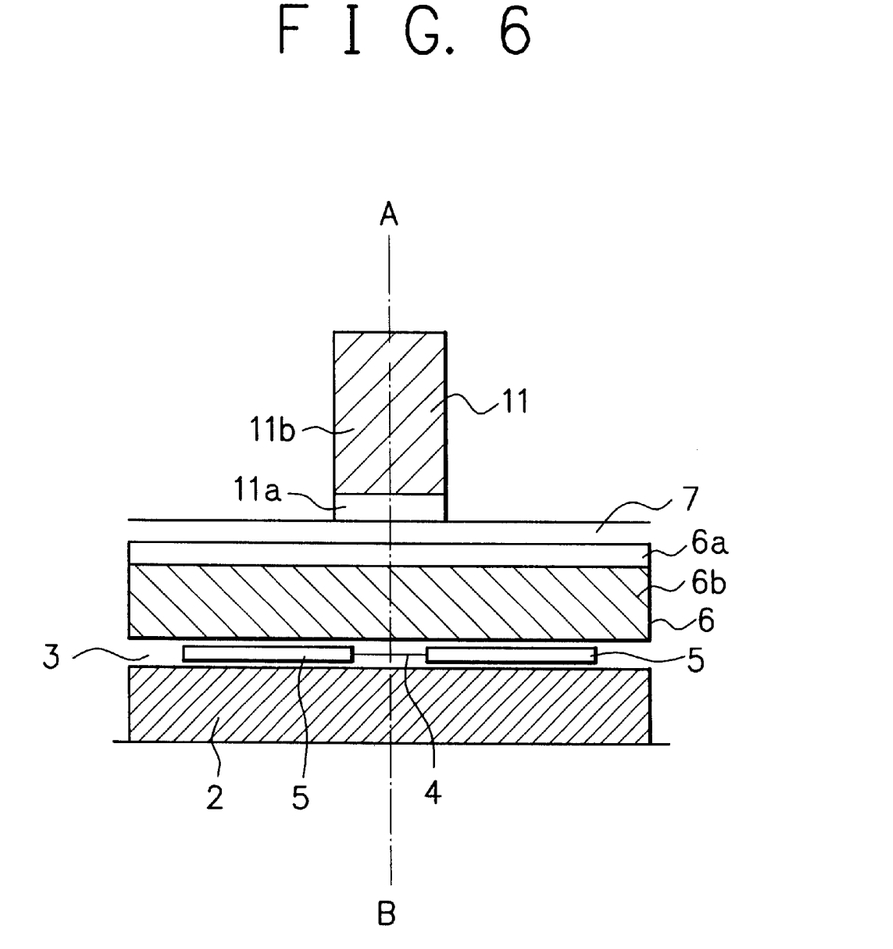
FIG. 6 is a diagram showing a structure of the second embodiment of the magnetic head of the present invention seen from the ABS facing a magnetic recording medium.

Next, a second embodiment of a magnetic head of the present invention is explained. In the second embodiment, a part, which has the same function that the first embodiment has, has the same reference number that the first embodiment has. FIG. 5 is a sectional view of the second embodiment of the magnetic head of the present invention at a line AB in FIG. 6. FIG. 6 is a diagram showing a structure of the second embodiment of the magnetic head of the present invention seen from an ABS facing a magnetic recording medium. As shown in FIG. 5, a substrate 1 becoming a slider consists of a composite ceramic 1a composed of alumina and titanium carbide, and an alumina film 1b. On this substrate 1, an MR head having reproducing function is formed. This MR head consists of a lower shield 2 made of a patterned Co—Zr—Ta film, an upper shield 6 composed of a Ni—Fe film 6b and a Co—Ni—Fe film 6a, and an MR effect element in a magnetism separating layer 3 made of alumina, disposed between the lower shield 2 and the upper shied 6. The thickness of the lower shield 2 is 1 μm, and the thickness of the Ni—Fe film 6b is 2 μm and the Co—Ni—Fe film 6a is 0.55 μm in the upper shield 6. And the gap between the lower shield 2 and the upper shield 6 is 0.12 μm.

As shown in FIG. 6, this MR effect element consists of a central region 4 that senses a magnetic field from a magnetic recording medium, and end regions 5 that have a function supplying a bias magnetic field and current to the central region 4. This central region 4 has a layered structure having a GMR effect called a spin-valve effect. This layered structure consists of a base Zr film with 3 nm thickness, a Pt—Mn film with 20 nm thickness, a Co—Fe film with 2 nm thickness, a Ru film with 0.7 nm thickness, a Co—Fe film with 2 nm thickness, a Cu film with 2 inm thickness, a Co—Fe film with 0.5 nm thickness, a Ni—Fe film with 2 nm thickness, and a Zr film with 3 nm thickness, layered from the side of the lower shield 2 in order. The width of the central region 4 is 0.4 μm and decides a reproducing track width.

The end regions 5 have a layered structure composed of a Co—Pt film with 20 nm thickness being a permanent magnetic film, and an Au film with 50 nm thickness being an electrode film.

On the GMR head mentioned above, an ID head having a recording function also uses the upper shield 6 as a first magnetic core is formed. In the ID head, the upper shield 6 is made to be the first magnetic core 6. In the first magnetic core 6, the magnetic film 6b is the Ni—Fe film whose film thickness δ2' is 2 μm, and the magnetic film 6a is the Co—Ni—Fe film whose film thickness δ1' is 0.55 μm. The Co—Ni—Fe film is composed of 65 weight % of Co, 12 weight % of Ni, 23 weight % of Fe, and has the saturation magnetization Bs (Bs1') of 2 T, and the resistivity ρ1' of 20 μΩcm. And at the Ni—Fe film, Bs (Bs2') is 1.1 T, and the resistivity ρ2' is 25 μΩcm.

A zero throat height is decided by a non magnetizing insulator 8 existing via a recording gap 7 made of an alumina film with 0.15 μm thickness on the first magnetic core (upper shield) 6. This non magnetizing insulator 8 is made of a photo-resist. And a coil 9 made of a Cu plated film is formed on the non magnetizing insulator 8, and the coil 8 is insulated by a non magnetizing insulator 10 and the non magnetizing insulator 8. This non magnetizing insulator 10 is also formed by the photo-resist.

A second magnetic core 11 is formed on a structure composed of the non magnetizing insulator 10 and the coil 9 in a state that the second magnetic core 11 exposes to the ABS facing the magnetic recording medium. The second magnetic core 11 consists of a magnetic film 11a made of a Co—Ni—Fe film whose Bs1 is 2 T and a magnetic film 1b made of a Ni—Fe film whose Bs2 is 1.6 T. The film thickness δ1 of the magnetic film 11a is 0.55 μm, and the film thickness δ2 of the magnetic film 11b is 2.5 μm. The Co—Ni—Fe film 11a) is composed of 65 weight % of Co, 12 weight % of Ni, 23 weight % of Fe, and had the resistivity ρ1 of 19 μΩcm. And the Ni—Fe film (11b) is composed of 45 weight % of Ni, and 55 weight % of Fe, and had the resistivity ρ2 of 50 μΩcm.

The composite type magnetic head of the second embodiment shows a good recording characteristic at a high frequency compared with the examples mentioned at the first embodiment. That is, at the magnetic head of the second embodiment, the higher the frequency is, the larger the O/W characteristic is and the smaller the NLTS is. These effects come from the following reasons. That is, at the magnetic head of the second embodiment of the present invention, the magnetic film 11a made of the Co—Ni—Fe film with high Bs1 of 2 T and 0.55 μm thickness is formed adjacent to the recording gap 7, therefore a sufficiently large recording magnetic field can be generated. And the magnetic film 11b made of the Ni—Fe film having high resistivity 50 μΩcm is formed with large thickness 2.5 μm, therefore, the eddy current loss at the high frequency is restrained.

At the second embodiment of the present invention, the Bs of the magnetic film 6b in the first magnetic core 6 is not necessary to be large and the resistivity of the magnetic film 6b is required to be higher than that of the Co—Ni—Fe film 6a. Therefore, the magnetic film 6b can be formed by one of the other composition of a Co—Ni—Fe film added Mo or Cr, or a Ni—Fe film added Mo or Cr. And in this case, a magnetic head having a good recording characteristic at a high frequency and being a low cost can be obtained as the same as the first embodiment.

The saturation magnetization Bs of the magnetic film 11b in the second magnetic core hi is not necessary to be large, but the resistivity ρ2 of the magnetic film 11b is required to be higher than that of the Co—Ni—Fe film being the magnetic film 11a. Therefore, the magnetic film 11b can be formed by one of the other composition of Ni—Fe films, or a Co—Ni—Fe film added Mo or Cr, or a Ni—Fe film added Mo or Cr. And in this case, a magnetic head having a good recording characteristic at a high frequency and being a low cost can be obtained as the same as the first embodiment.

At the second embodiment of the present invention, in order to obtain increased writing ability, the magnetic film 6a and the magnetic film 11a, disposed at the near sides of the recording gap 7, have to have the thickness being 0.1 μm or more, and preferably, the thickness will be 0.3 μm or more. On the other hand, in order to restrain the influence of the characteristic deterioration (eddy current loss) at the high frequency, the thickness of the magnetic films 6a and 11a must be 1.0 μm or less, preferably, 0.7 μm or less.

Next, referring to FIGS. 5 and 6, a manufacturing method of a composite type magnetic head of the second embodiment of the present invention is explained. An alumina film 1b being an insulation material is formed on a composite ceramic 1a, made of alumina and titanium carbide, by a sputtering method. And a substrate 1 becoming a slider consists of the alumina film 1b and the composite ceramic 1a. On this alumina film 1b, an MR head having a reproducing function and an ID head having a recording function are formed in order.

The MR head is formed in the following processes. First, a Co—Ta—Zr film becoming a lower shield 2 is formed by the sputtering method with 1 μm thickness. After this, the Co—Ta—Zr film patterned by etching is applied by an ion beam using a photo resist mask. Next, an alumina film forming a reproducing gap is formed by the sputtering method with 0.03 μm thickness. On this alumina film, a spin-valve layered structure becoming a central region 4 is formed by the sputtering method. This layered structure is formed by layering in order a base Zr film with 3 nm thickness, a Pt—Mn film with 20 nm thickness, a Co—Fe film with 20 nm thickness, a Ru film with 0.7 nm thickness, a Co—Fe film with 2 nm thickness, a Cu film with 2.1 nm thickness, a Co—Fe film with 0.5 nm thickness, a Ni—Fe film with 2 nm thickness, and a Zr film with 3 nm thickness from the side of the lower shield 2. Further, this layered structure is patterned by etching applied by the ion beam using a photo resist mask.

By using this photo resist mask, a layered structure film, made of a Co—Pt film with 20 nm thickness and an Au film with 50 nm thickness, becoming end regions 5, is formed by the sputtering method, and by lifting off this photo resist mask, an MR element is completed. On this MR element, an alumina film forming another reproducing gap is formed by the sputtering method with 0.054 μm thickness. The length of this reproducing gap becomes 0.12 μm.

The ID head is formed in the following processes. A magnetic shield (upper shield) 6, which also works as a recording magnetic core, is formed by a method that makes a plating film grow within the photo resist frame. First, a magnetic film 6b in the first magnetic core (upper shield) 6 is formed in a plating bath shown below. By using this plating bath, the magnetic film 6b being a Ni—Fe plated film having Ni 80 weight % and 2 μm thickness is formed.

The conditions of the plating bath for the Ni—Fe film are as follows.

The conditions of the plating bath for the Ni—Fe film:

| Name | Concentration (mol/L) |
|---|---|
| Nickel chloride | 0.16 |
| Nickel surfate | 0.08 |
| Sodium chloride | 0.42 |
| Boric acid | 0.40 |
| Sodium saccharin | 0.0072 |
| Ferrous surfate | 0.0045 |
| Sodium lauryl surfate | 0.00035 |
| 36% hydrochloric acid | 0.0017 |
| PH | 2.6 |
| Current density | 6 mA/cm$^2$ |

Next, in succession to the forming of the Ni—Fe film (6b), a magnetic film 6a being a Co—Ni—Fe film with the thickness δ1' of 0.55 μm is formed in a plating bath shown below. By using this plating bath, the magnetic film 6b being the Co—Ni—Fe plated film having Co 65 weight %, Ni 12 weight %, and Fe 23 weight % is formed.

The conditions of the plating bath for the Co—Ni—Fe film are as follows.

The conditions of the plating bath for the Co—Ni—Fe film:

| Name | Concentration (mol/L) |
|---|---|
| Cobalt surfate | 0.092 |
| Nickel surfate | 0.20 |
| Ammonium chloride | 0.28 |
| Boric acid | 0.40 |
| Ferrous surfate | 0.0016 |
| Sodium lauryl surfate | 0.00035 |
| 80% sulfuric acid | 0.0012 |
| PH | 2.8 |
| Current density | 15 mA/cm$^2$ |

The saturation magnetization Bs of the magnetic film 6b in the first magnetic core 6 is not necessary to be large and the resistivity of the magnetic film 6b is required to be higher than that of the Co—Ni—Fe film 6a. Therefore, the magnetic film 6b can be formed by a plated film such as a Co—Ni—Fe film added Mo or Cr, or a Ni—Fe film added Mo or Cr.

On the first magnetic core (upper shield) 6, a recording gap 7, made of an alumina film with 0.18 μm thickness, is formed by the sputtering method. And after this, a non magnetizing insulator 8 deciding a zero throat height is formed by the photo resist. On this non magnetizing insulator 8, a coil 9 is formed within the photo resist frame by a method that makes a Cu plating film grow. After this, a non magnetizing insulator 10 is formed by the photo resist.

A second magnetic core 11 is formed on a structure composed of the non magnetizing insulator 10 and the coil 9 in a state that the second magnetic core 11 exposes to an ABS facing a magnetic recording medium. At this time, a method that makes a plating film grow within the photo resist frame is used. The second magnetic core 11 consists of a magnetic film 11a made of a Co—Ni—Fe film having Bs of 2 T and a magnetic film 11b made of a Ni—Fe film having Bs of 1.6 T. The conditions of the plating baths for the Co—Ni—Fe film and the Ni—Fe film are as follows:

The conditions of the plating bath for the Co—Ni—Fe film:

| Name | Concentration (mol/L) |
|---|---|
| Cobalt surfate | 0.092 |
| Nickel surfate | 0.20 |
| Ammonium chloride | 0.28 |
| Boric acid | 0.40 |
| Ferrous surfate | 0.0016 |
| Sodium lauryl surfate | 0.00035 |
| 80% sulfuric acid | 0.0012 |
| PH | 2.8 |
| Current density | 15 A/cm$^2$, and |

The conditions of the plating bath for the Ni—Fe film:

| Name | Concentration (mol/L) |
|---|---|
| Nickel chloride | 0.16 |
| Nickel surfate | 0.08 |
| Sodium chloride | 0.42 |
| Boric acid | 0.40 |
| Sodium saccharin | 0.0072 |
| Ferrous surfate | 0.010 |
| Sodium lauryl surfate | 0.00035 |
| 36% hydrochloric acid | 0.0017 |
| PH | 2.6 |
| Current density | 6 mA/cm$^2$ |

The thickness of the magnetic film 11a is 0.55 μm and the thickness of the magnetic film 11b is 2.5 μm. The composition of the Co—Ni—Fe film is that the Co is 65 weight %, the Ni is 12 weight %, the Fe is 23 weight %, and the resistivity ρ1 is 19 μΩcm. And the composition of the Ni—Fe film is that the Ni is 45 weight %, the Fe is 55 weight %, and the resistivity ρ2 is 50 μΩcm.

At the manufacturing method of the magnetic head of the second embodiment of the present invention, a magnetic head, which is a low cost, and also has large saturation magnetization Bs, and is suitable for a high density recording with a good high frequency characteristic, can be manufactured.

Figure 7:
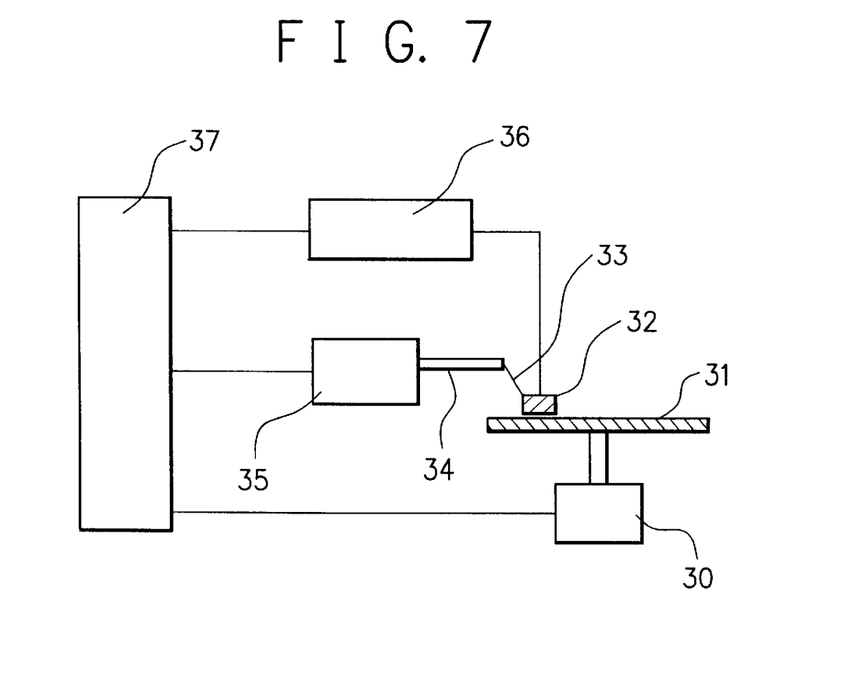
FIG. 7 is a block diagram showing a magnetic recording and reproducing apparatus used a composite type magnetic head of the present invention.
Figure 8:
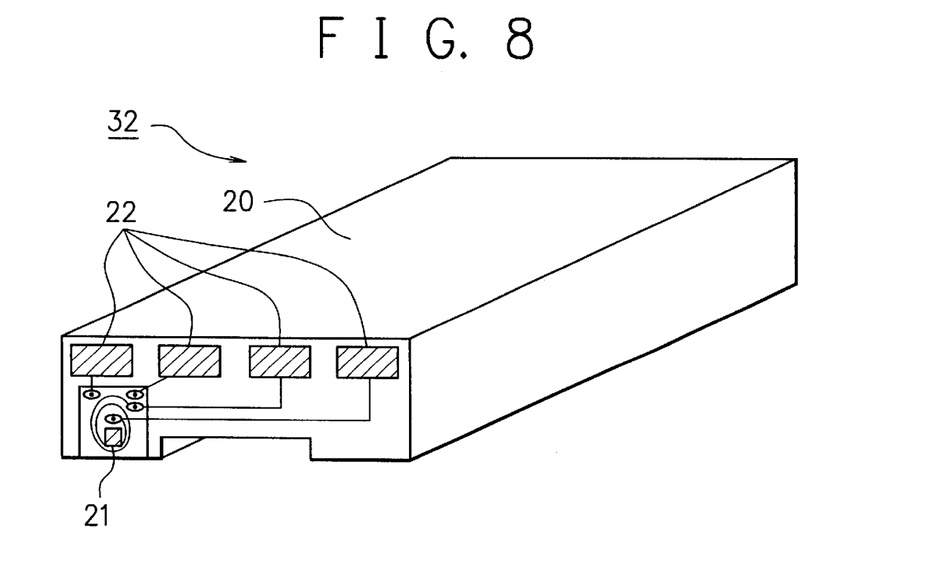
FIG. 8 is a diagram showing a structure of the composite type magnetic head of the present invention.

FIG. 7 is a block diagram showing a magnetic recording and reproducing apparatus using a composite type magnetic head of the present invention. As shown in FIG. 7, a composite type magnetic head 32 of the present invention is held by a suspension 33 and an arm 34 in a state that the composite type magnetic head 32 faces to a magnetic recording face of a magnetic recording medium 31, which is rotated by a driving motor 30, and the tracking of the composite type magnetic head 32 is executed by a voice coil motor (VCM) 35. FIG. 8 is a diagram showing a structure of a composite type magnetic head of the present invention. As shown in FIG. 8, the composite type magnetic head 32 consists of a slider 20, electrodes 22, and a recording and reproducing element 21. Recording and reproducing operation is executed by signals from a recording and reproducing channel 36 shown in FIG. 7 to the composite type magnetic head 32. This recording and reproducing channel 36, the VCM 35 which also executes positioning the composite type magnetic head 32, and the driving motor 30 are controlled by a control unit 37 shown in FIG. 7.

At the magnetic recording and reproducing apparatus mentioned above, a magnetic recording and reproducing apparatus, which has a recording density of 15 Gbits/inch$^2$ or more, can be realized, by that acoercive force of the magnetic recording medium 31 is made to be 3500 Oe or more, and a magnetic gap between the magnetic recording medium 31 and the composite type magnetic head 32 is made to be 30 nm or more.

As mentioned above, there is a problem that a practical plated film realizing high saturation magnetization Bs about 2 T can not realize a high resistivity at the same time, and when this plated film is applied to a magnetic head, the high frequency characteristic is deteriorated. This problem is solved at the present invention. Further, at the present invention, a magnetic head that is low cost and has large saturation magnetization, and has a excellent high frequency characteristic suitable for a high density recording can be realized. In addition to the magnetic head, at the present invention, a low cost manufacturing method of the magnetic head can be realized. Moreover, a recording and reproducing apparatus, which realizes a high recording density being 15 gbits/inch$^2$ or more by using the magnetic head of the present invention, can be realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A method of manufacturing a magnetic head, comprising:

forming a first magnetic core for recording by an electrodeposition process; and forming a second magnetic core for recording by an electrodeposition process, said second magnetic core disposed adjacent the first magnetic core, said first magnetic core and said second magnetic core separated by a recording gap, wherein at least one of said first magnetic core and said second magnetic core comprises a first plated magnetic layer and a second plated magnetic layer, said first plated magnetic layer disposed nearer the recording gap than said second plated magnetic layer, and wherein a saturation magnetization of said first plated magnetic layer is greater than about 1.7 tesla, and wherein a resistivity of said first plated magnetic layer is less than a resistivity of said second plated magnetic layer, and wherein a thickness of said first plated magnetic layer is less than a thickness of said second plated magnetic layer.

* * * * *